June 23, 1970  J. M. BRIGHTON  3,516,560
POWER SKIDS
Filed June 26, 1968  2 Sheets-Sheet 1
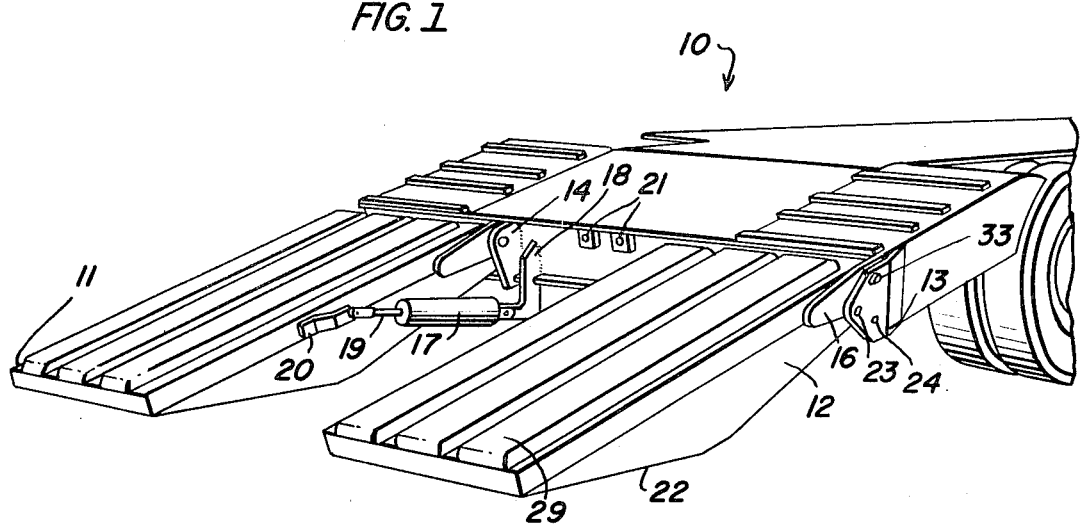
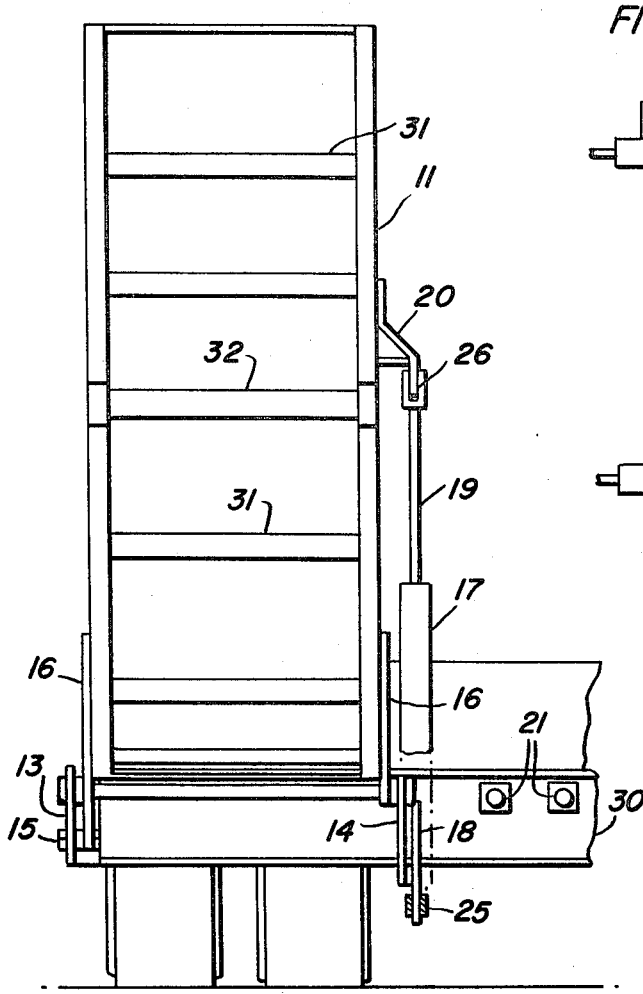
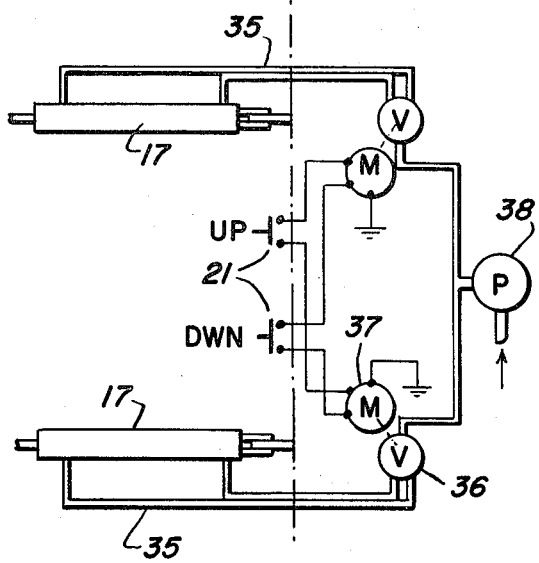
INVENTOR.
JOHN M. BRIGHTON
BY
William M. Hobby
Attorney June 23, 1970    J. M. BRIGHTON    3,516,560
POWER SKIDS
Filed June 26, 1968    2 Sheets-Sheet 2
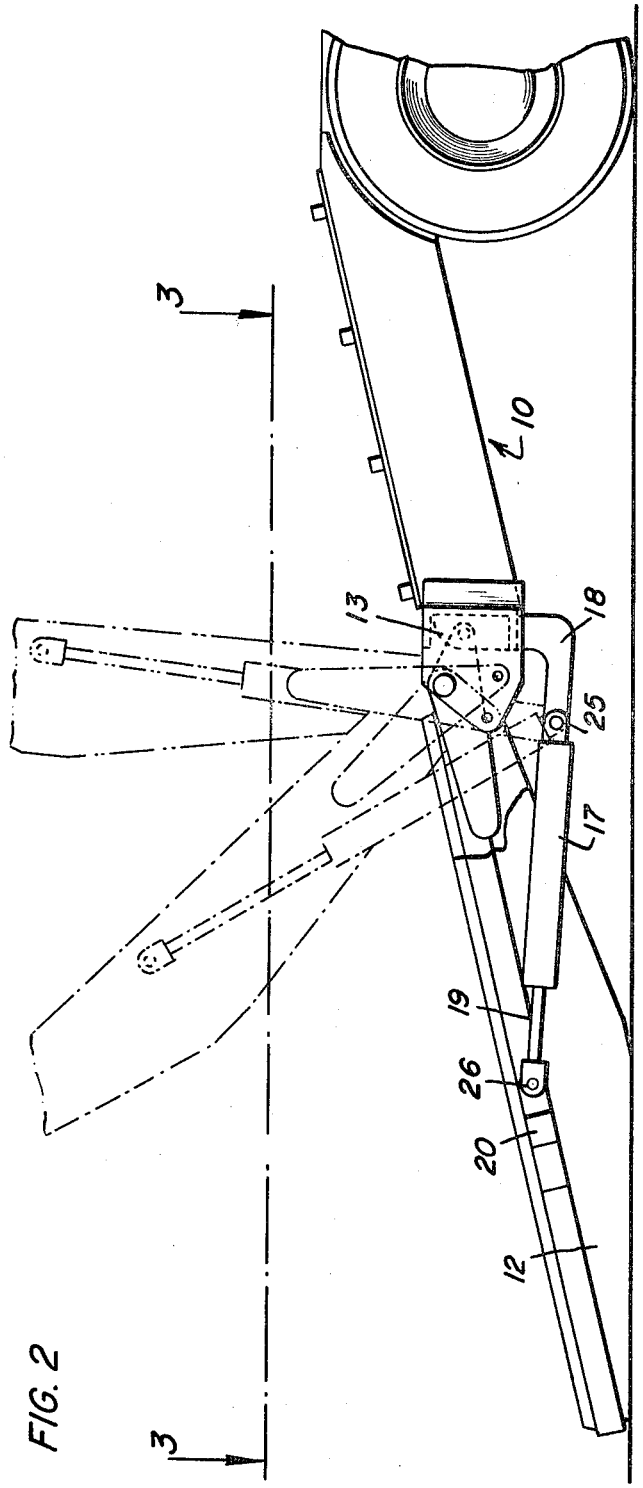
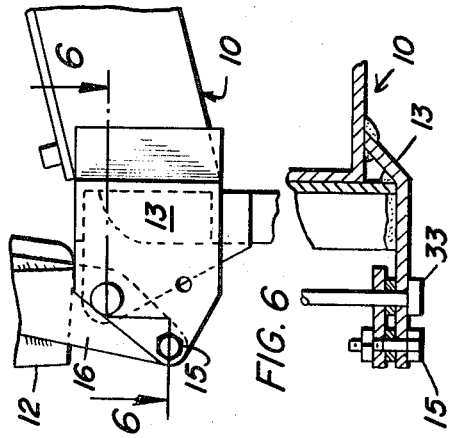
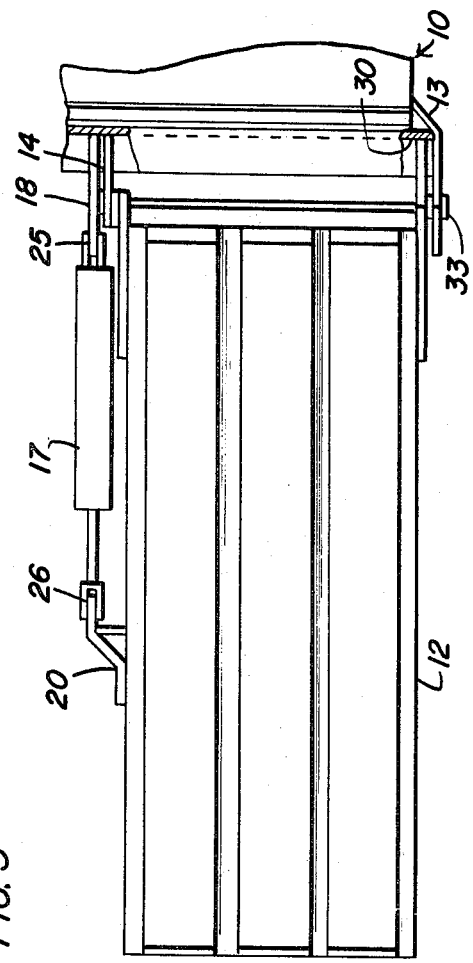
INVENTOR.
JOHN M. BRIGHTON
BY
William M. Hobby
Attorney United States Patent Office 3,516,560
Patented June 23, 1970

3,516,560
POWER SKIDS
John Monroe Brighton, 1612 N. Dauphin Lane,
Orlando, Fla. 32803
Filed June 26, 1968, Ser. No. 740,241
Int. Cl. B60p 1/44
U.S. Cl. 214—85          4 Claims

ABSTRACT OF THE DISCLOSURE

A power operated skid apparatus for vehicle trailers and the like, especially adapted for low-boy heavy duty trailers, and having skids attached to a trailer to form a loading ramp in their extended position and a vertical block to prevent loads from falling off the trailer in their retracted position. Hydraulic or pneumatic cylinders connected between leverage brackets located on the trailer, and the hydraulic cylinders are used to drive the skids from extended to retracted positions and locking pins prevent the skids from accidentally falling while the trailer is in use.

BACKGROUND OF THE INVENTION

Field of the invention

The present invention relates to power skids and more particularly to power skids which act as safety blocks for preventing equipment from rolling or sliding off a trailer when the skids are in a retracted position.

Power operated skids are disclosed being movably mounted to the rear of a trailer, or the like, having an extended position and a retracted position. The extended position forms a loading ramp between the earth and the trailer for loading equipment and the like such as drag lines, cranes and spreaders. Hydraulic or pneumatic powered cylinders are connected between leverage brackets, which are attached to and extend beneath the trailer, and each skid in order to drive the skids from the extended to the retracted position. A safety lock is provided to assure that the skids cannot break loose and fall from the retracted to an extended position and also to provide sufficient holding force to prevent loss of a load on the trailer.

Description of the prior art

In the past various types of ramps have been provided for low-boy trailers. The most common type being large skid boards that are placed by hand between the truck bed and the earth. These boards have resulted in many accidents and loss of time, such as in locating boards and having personnel move and place the boards in the proper place. A large number of ramps have been suggested for attachment to the trailers to overcome the problems associated with skid boards, some of which have been power operated. These trailer connected ramps have usually been too complicated and expensive to gain any degree of commercial success and most form an integral part of the trailer and need to be added during the manufacturing of the trailer, since otherwise they would be expensive to connect to existing trailers. Accordingly, an object of the invention is to provide a relatively inexpensive, simple, and yet, reliable power operated skid which has additional safety features.

More specifically, it has been suggested to rotatably attach a bar transverse to the rear end of a trailer with the ramps attached to the bar. The bar is then rotated in some power operated manner in order to rotate the ramp from a position on the ground to position laying flat upon the trailer. These ramps require some means of getting sufficient torque to the bar to rotate a heavy ramp. One of the biggest problems with this type of ramp is finding a means for aligning the ramp with the trailer both in an open and closed position without the ramp hitting the trailer during rotation. These devices have used chain and sprocket drives as well as torque bar drives and have used single ramps or fold up types.

Another prior drive device utilizes the end of a truck in which the ramp is horizontal and level with the trailer and one end merely drops to the ground for loading. This apparatus uses a toggle linkage connected between a brace and a single ramp and has dual hydraulic cylinder to actuate and hold the toggle linkage. This arrangement is fairly complicated and expensive which requires a heavy hydraulic system to operate the ramp.

BRIEF DESCRIPTION OF THE DRAWINGS

Other objects, features and advantages of this invention will be apparent from a study of the written description and the drawings in which:

FIG. 1 shows a perspective view of the rear of a "low boy" trailer with the instant invention attached thereto;

FIG. 2 is a side elevation view, with parts broken away, of the invention as shown in FIG. 1 with the alternate positions shown in an intermediate position by means of dot-dash phantom lines and a substantially vertical terminal position shown in dotted lines;

FIG. 3 is a sectional view taken on the line 3—3 of FIG. 2;

FIG. 4 is a rear elevational view of the left structures of the embodiment of FIG. 1;

FIG. 5 is a fragmentary enlarged side elevation view of the pivot and locking elements;

FIG. 6 is a sectional view taken on the line 6—6 of FIG. 5; and

FIG. 7 is a combination hydraulic and electrical diagram illustrating a preferred means of actuating the lift cylinders employed in this invention.

DESCRIPTION OF THE PREFERRED EMBODIMENT

FIG. 1 shows an embodiment of the present invention connected to a heavy duty low boy trailer 10, and having left side skid 11 and right side skid 12 movably fastened to trailer 10 with outside brackets 13 and inside brackets 14. Rods or bars 15 may be movably or fixedly attached to brackets 13 and 14 and pass through skid brackets 16, which are attached to skids 11 and 12 such as by welding, and are adapted to allow skids 11 and 12 to rotate on or with bars 15.

Skids 11 and 12 may have wooden treads 16 thereon for protection against heavy track vehicles being loaded. Such treads may be replaced from time to time as desired. Hydraulic or pneumatic cylinders 17 are attached to elbow shaped leverage brackets 18 which are in turn fixedly attached to trailer 10 such as by welding. Brackets 18 extend below the trailer bed of trailer 10 and provide the necessary leverage for cylinders 17 to drive skids 11 and 12.

Cylinder rod 19 is attached to a pin type attachment to bracket 20. Cylinders 17 are thus used to drive skids 11 and 12 from an extended position as shown to a retracted position by operation of controls 21 which operate a fluid motor and valve system for applying pressure to hydraulic cylinders 17. It should be noted that skids 11 and 12 have bottom surfaces 22 shaped for great strength while providing good support from the ground by having a large portion in contact therewith. Holes 23 and 24 are provided in brackets 13 for inserting safety pins and provide a safety locking means for locking the skids in an upright position.

Turning now to FIG. 2 a side view of the embodiment of FIG. 1 shows trailer 10, skids 12, cylinder 17 connected to bracket 18 and to bracket 20. Phantom views indicate the operation of the skids showing the skid 12 as it would appear in its locking position, one such position being substantially upright or perpendicular to the horizontal bed of trailer 10 and the second being at approximately a 45 degree angle with the horizontal. A pin connection 25 can be seen connecting bracket 18 to cylinder 17 and a similar connection 26 connecting the rod 19 to bracket 20. As can be seen when the skid 12 is in an upright position the cylinder rod 19 is fully extended. The cylinder can be, of course, locked to hold the skid in an upright position and since the skid 12 is in an upright position it may also be used for a rear block to prevent a load on the trailer from coming off. Damage can result from a falling skid and it has been found that safety locking means are desirable and are provided by steel pins or the like being inserted through brackets 13. This provides a wide safety margin because of the great shear force required to break a large steel pin.

Referring now to FIG. 3 a view taken along line 3—3 of FIG. 2 shows skid tread boards 16 attached to skid 12 and cylinder 17 connected between brackets 18 and 20. Pin connection 25 and 26 can be more clearly seen and the top of brackets 13 and 14 can be seen welded to trailer 10. Bracket 13 is shaped to extend around a channel member 30 which channel also provides bracing support.

With reference to FIG. 4 a rear elevation of left side skid 11 is shown with cylinder 17, cylinder rod 19 connected to bracket 20 by connecting pin 26, channel 30, controls 21 and brackets 16 are also shown in this view as is the transverse supporting and bracing structure members 31 including a center bracing member 32.

FIG. 5 shows a fragmentary of the pivot assembly and safety locking means of the invention and FIG. 6 is a view taken along line 6—6 of FIG. 5. These figures show the corner of trailer 10 with bracket 12 welded thereto and bracket 16 welded to skids 12 and pivoted on joints 15 with safety locking pin 33 inserted to hold the skid in position.

FIG. 7 shows hydraulic cylinders 17, which could of course be pneumatically operated, connected by hoses 35 to valves 36 which are controlled by electric motors 37 operated by controls 21. Power is supplied to the fluid by fluid motor or other power source 38 which is connected by hoses to valves 36. As can be seen at this point a person standing between skids 11 and 12 can actuate controls 21 to apply fluid pressure to cylinders 17 to drive the skids between an extended and a retracted position. Thus simple and reasonably inexpensive power skids have been provided which are safe to operate, easily installed to existing trailers and serve the additional functions of protection against loads slipping or rolling off the rear of the trailer.

This invention is not to be construed as limited to the particular forms disclosed herein, since these are to be regarded as illustrative rather than restrictive.

I claim:
1. A combination blocking and power operated skid apparatus for a trailer, or the like, comprising in combination:
  (a) a plurality of skids movably attached to said trailer or the like and each said skid having an extended position forming a ramp from the earth to said trailer, and a retracted position in which each said skid is substantially perpendicular to the horizontal bed of said trailer for preventing loads on said trailer from accidentally falling off;
  (b) a plurality of leverage brackets fixedly attached to and extending beneatth said trailer bed each said bracket having pivots thereon;
  (c) a plurality of skid brackets each fixedly attached to one skid each having a pivot thereon;
  (d) a plurality of hydraulic operated cylinders each being pivotally connected to one said leverage bracket and to one said skid bracket and adapted to drive each said skid from said extended position to said retracted position;
  (e) safety locking means for mechanically locking each said skid in said retracted position whereby said skids are adapted to block loads on said trailer from falling off when said skids are locked in a retracted position; and
  (f) said mechanical locking means including metal pins for locking said skids to brackets attached to said trailer.

2. The apparatus according to claim 1 in which said safety locking means is adapted to lock said skids in a position between the extended and retracted position.

3. The apparatus according to claim 2 in which said leverage brackets are elbow shaped.

4. The apparatus according to claim 3 in which said cylinders are driven by an electric motor driven hydraulic system.

References Cited

UNITED STATES PATENTS

| | | | |
|---|---|---|---|
| 1,699,882 | 1/1929 | Ferguson | 214—85 |
| 2,900,094 | 8/1959 | Ferguson | 214—85 |
| 2,966,274 | 12/1960 | Price | 214—85 |
| 3,095,989 | 7/1963 | Morrison | 214—85 |
| 3,138,270 | 6/1964 | McCarty | 214—77 |
| 3,138,272 | 6/1964 | Flowers | 214—85 |

ALBERT J. MAKAY, Primary Examiner

U.S. Cl. X.R.

14—71